United States Patent [19]
Fletcher et al.

[11] 3,972,651
[45] Aug. 3, 1976

[54] SOLAR-POWERED PUMP

[76] Inventors: James C. Fletcher, Administrator of the National Aeronautics and Space Administration, with respect to an invention of; Charles C. Kirsten, Monterey Park, Calif.

[22] Filed: Apr. 9, 1975

[21] Appl. No.: 566,493

[52] U.S. Cl. .............................. 417/141; 60/517; 62/6; 417/207; 417/379; 417/209
[51] Int. Cl.² ................. F04F 1/06; F04B 17/00; F01B 29/10; F25B 9/00
[58] Field of Search ........... 417/379, 207, 208, 209, 417/137, 139, 141; 62/6; 60/641, 517

[56] References Cited
UNITED STATES PATENTS

| | | | |
|---|---|---|---|
| 776,106 | 11/1904 | Beurrier | 118/503 |
| 3,478,695 | 11/1969 | Goranson et al. | 417/379 |
| 3,513,659 | 5/1970 | Martini | 62/6 |
| 3,776,662 | 12/1973 | Hall | 417/110 X |

FOREIGN PATENTS OR APPLICATIONS

| 1,175,441 | 11/1958 | France | 417/209 |
|---|---|---|---|

*Primary Examiner*—William L. Freeh
*Assistant Examiner*—Richard E. Gluck
*Attorney, Agent, or Firm*—Monte F. Mott; Wilfred Grifka; John R. Manning

[57] ABSTRACT

A solar-powered pump particularly suited for intermittently delivering a stream of water. The pump is characterized by a housing adapted to be seated in a source of water having a water discharge port disposed above the water line of the source, a sump including a valved inlet port through which water is introduced to the sump, disposed beneath the water line, a displacer supported for vertical reciprocation in said housing, an air passageway extended between the vertically spaced faces of the displacer, a tipple disposed adjacent to the water discharge port adapted to be filled in response to a discharge of water from the housing, and a line so interconnecting the tipple and the displacer that the displacer is moved upwardly in response to a filling of the tipple and moved downwardly once water is discharged from the tipple. Air above the displacer is expanded in response to solar energy impinging on the housing, transferred into pressurizing relation with the sump for forcing water from the sump, while the sump subsequently is depressurized for charging in a response to a lifting of the displacer, and a cooling of the air in the housing as it is displaced to the lower part of the housing.

7 Claims, 4 Drawing Figures

U.S. Patent  Aug. 3, 1976  3,972,651
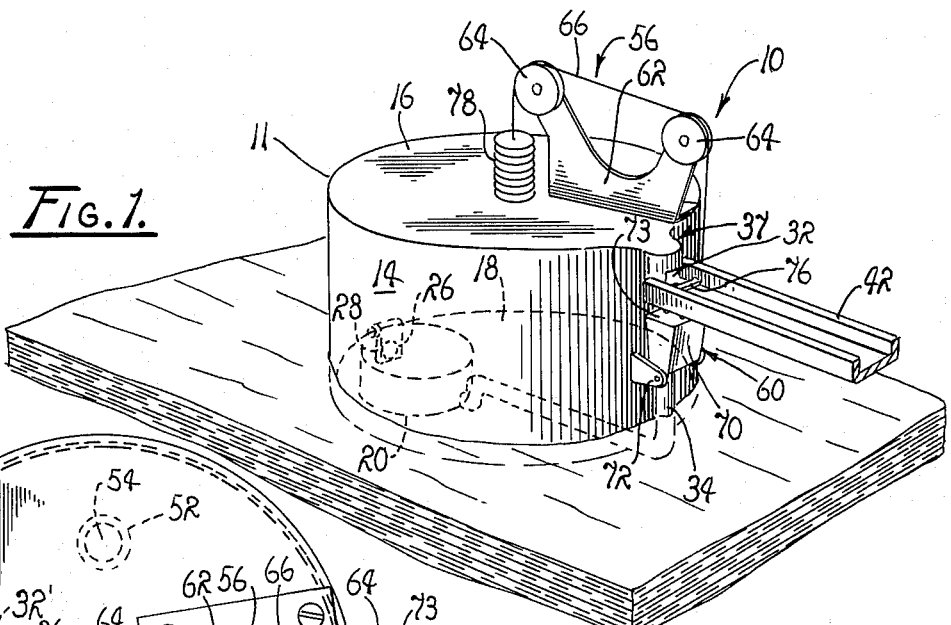
FIG. 1.
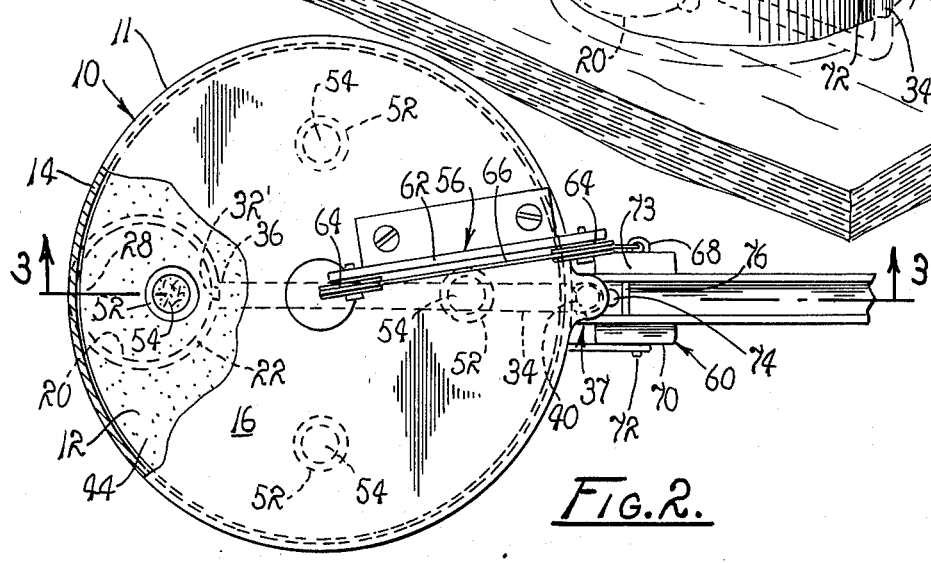
FIG. 2.
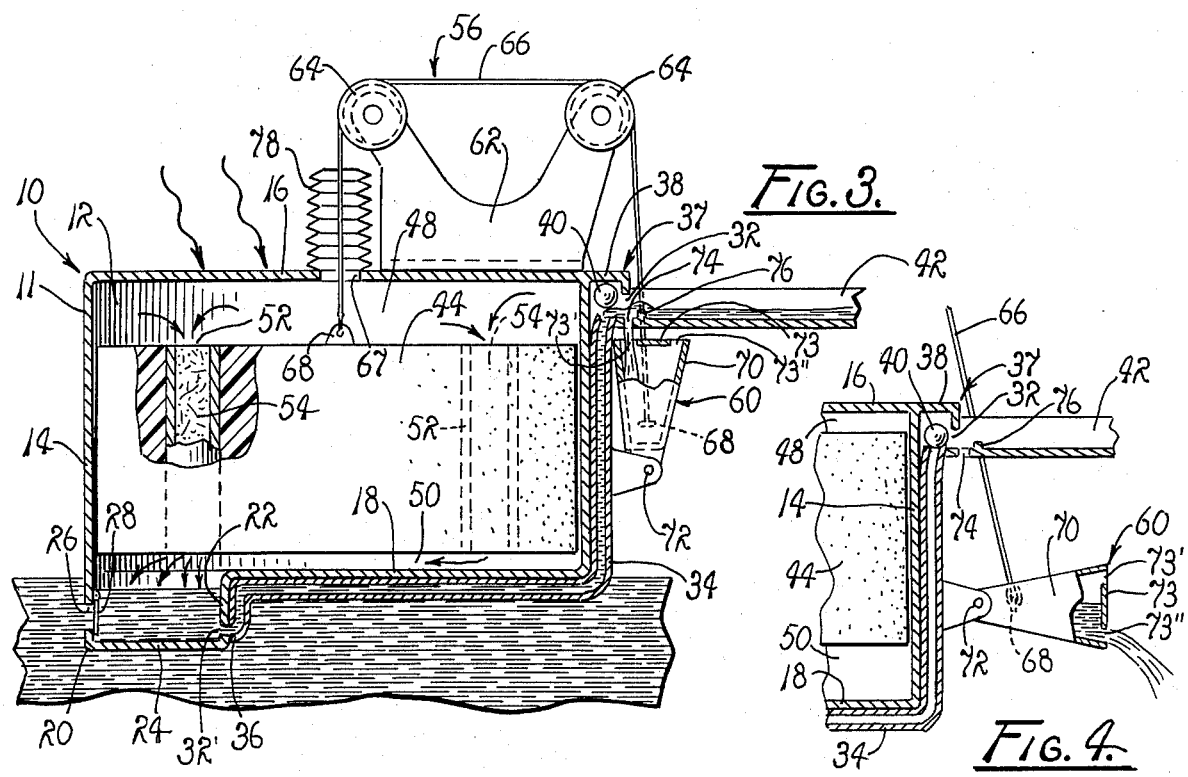
FIG. 3.
FIG. 4.

SOLAR-POWERED PUMP

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to water pumps and more particularly to a low-cost pump suitable for use in underdeveloped regions adapted to utilize unconcentrated sunlight as a source of energy and atmospheric air as a working fluid for intermittently delivering a stream of water from a given source.

Many of the underdeveloped nations of the world are located in arid zones bathed in sunshine for large portions of each year. In order to supply sufficient quantities of water necessary for sustaining agriculture productivity, it often is necessary to utilize irrigation systems for delivering water to fields from remote sources such as flowing streams. Even though available water must be lifted only through relatively short distances, available pumping systems frequently are of a primitive nature and must be operated in an inefficient manner.

2. Description of the Prior Art

Often animals, such as oxen, are employed as a source of power for driving a bucket-wheel and similar primitive devices for lifting water from a stream. Of course, animals consume relatively large quantities of the agricultural output derived from the thus irrigated fields so that a use of such pumping systems tends to constitute a self-defeating experience.

While internal combustion engines have been employed in many areas, of the nature aforementioned, with varying degrees of success, it can be appreciated that in many primitive areas the technology required for maintenance and operation of irrigation systems equipped with internal combustion engines simply is not available. Thus, even though made available, a widespread usage of such systems is often found to be totally impractical.

It is, therefore, the general purpose of the instant invention to provide a low-cost, low-technology pump which is particularly suited for use in charging irrigation systems found in underdeveloped, arid regions of the earth.

OBJECTS AND SUMMARY OF THE INVENTION

It is an object of the instant invention to provide a cyclically operable pump for delivering a stream of water from a source.

It is another object to provide a low-cost, low-technology pump having particular utility in irrigation systems employed in underdeveloped arid regions of the earth.

It is another object to provide a solar-powdered water pump adapted to employ the basic principles of the Stirling heat engine, particularly suited for use in intermittently delivering a stream of water from a cooled source.

It is another object to provide a cyclically operable pump adapted to employ unconcentrated sunlight as a source of energy and atmospheric air as a working fluid for intermittently delivering a stream of water from a source.

It is another object to provide a cyclically operable pump adapted to utilize unconcentrated sunlight as a source of energy and atmospheric air as a working fluid for intermittently delivering a stream of water from a source, such as a flowing stream, to an irrigation system maintained and operated by personnel lacking in highly developed technical skills.

Another object is to provide a cyclically operable water pump for intermittently delivering a stream of water from a source to an irrigation system found in underdeveloped arid regions, although not necessarily restricted thereto, since the device embodying the principles of the instant invention has utility at any environment wherein an abundance of solar energy exists in the presence of a source of water.

These and other objects and advantages are achieved through the use of a low-cost, low-technology pump adapted to employ the basic principles of the Stirling heat engine in utilizing unconcentrated sunlight, as a source of energy, atmospheric air as a working fluid acting directly on the surface of water confined under pressure and a water source as an energy dissipator for cyclically pumping the water as the air is cyclically cooled and expanded, for alternately charging on an air-cooling portion of a cycle of operation, and discharging on an air-expansion portion of the cycle, as will become more readily apparent by reference to the following description and claims in light of the accompanying drawings.

BRIEF DESCRIPTION OF THE DRAWINGS

FIG. 1 is a perspective view of a pump having a tipple cup which embodies the principles of the instant invention.

FIG. 2 is a fragmented, top plan view of the pump shown in FIG. 1.

FIG. 3 is a cross-sectional view taken generally along line 3—3 of FIG. 2, illustrating the cup in a charging position.

FIG. 4 is a fragmented, partially sectioned view illustrating the cup in a discharging position.

DESCRIPTION OF THE PREFERRED EMBODIMENT

Referring now with more particularity to the drawings, wherein like reference characters designate like or corresponding parts throughout the several views, there is shown in FIG. 1 a cyclically operable pump, generally designated 10, which embodies the principles of the instant invention.

At this juncture it is important to appreciate that the pump 10 has particular utility in lifting water through relatively short distances, such as to an elevation above a stream's confining embankments. However, it is to be understood that, where so desired, the pump 10 may be employed in a cascaded relationship with other pumps of similar and other designs and configurations.

The pump 10 includes an hermetically sealed housing 11 defining therein an enclosure 12. The housing 11 includes a cylindrical side wall 14, a top plate 16 and a bottom plate 18, which collectively form the enclosure 12. The side wall 14 and the plates 16 and 18 preferably are formed of sheet material, such as fiberglass, or wood of relatively low thermal conductivity, integrated into a unitary, hermetically sealed relationship.

Within the bottom plate 18 there is provided a sump 20. The sump 20, as shown, comprises a recess communicating with the enclosure and includes a cylindrical wall 22 integrally connected with the bottom plate 18. A bottom wall 24 is provided for the sump 20. Within the cylindrical wall 22 there is formed a valved intake port 26 which is periodically closed by a flapper valve 28 provided for facilitating cyclic charging and pressurization of the sump.

Since flapper valves are of a generally known design, it suffices to understand that the valve 28 includes a pivotal plate, not designated, which moves inwardly, with respect to the sump 20, for opening the valve. This occurs when pressures within the sump drop below external pressures applied to the pivoted plate. Similarly, the pivoted plate is forced into a sealed relationship with the intake port 26 when pressures within the sump 20 exceed external pressures applied to the plate, for thus closing the valve. Thus, the flapper valve 28 functions as a one-way water inlet valve, in response to changes in pressures in the sump 20, for accommodating a charging and discharging thereof.

The pump 10 also includes a discharge port 32 through which water is discharged from the pump. The sump 20 communicates with the discharge port 32 through a tubular conduit 34 having one end communicating with the discharge port and the opposite end thereof, designated 36, communicating with the sump through an orifice 32'. It should, therefore, be appreciated that in operation the sump 20 is charged through the intake port 26 and discharged through the discharge port 32, via the discharge conduit 34.

As a practical matter, the discharge conduit 34, where so desired, comprises a horizontal segment of tubing secured in place along the external surface of the bottom plate 18 and a vertical segment secured in place along the external surface of the side wall 14. Additionally, the discharge port 32 preferably is closed by a pressure-responsive ball-check valve, generally designated 37, which includes a housing 38 within which there is a ball 40 supported to seat on a ball seat, not designated, concentrically related to the end surface of the conduit 34. Since the design and function of ball-check valves are well understood by those familiar with the design and fabrication of hydraulic devices, including pumps and the like, a detailed description of the ball-check valve 37 is omitted in the interest of brevity. It suffices, however, to understand that the ball 40 is permitted to rise off its seat, due to increases in the pressure of the water confined in the conduit 34, for accommodating a discharge of water from the discharge port 32, and sealing engages its seat, in response to reductions in the pressure, for preventing an occurence of a back flow through the discharge conduit 34.

Immediately adjacent the discharge port 32 there is provided a flume 42 which functions as a conduit for delivering the water discharged from the discharge port 32 to a selected location. Of course, conduits of other designs, such as pipes, can be employed equally as well.

Within the enclosure 12 there is a displacer 44 loosely supported for reciprocation along a vertically oriented rectilinear path. Preferably, the displacer is formed from a lightweight, economic material, such as an expanded cellular polystyrene, and the like. The depth or vertical dimension of the displacer 44 is such that a displacer in cooperation with the side wall 14 and the top plate 16 defines a variably dimensioned air expansion chamber, designated 48, above the displacer while beneath the displacer there is defined a variably dimensioned cooling chamber, designated 50, cooled in response to the cooling effects of the stream of water within which the pump, in operation, is situated.

The expansion chamber 48 and cooling chamber 50 are in continuous communication, preferably through a plurality of regenerators 52. However, where so desired, the displacer 44 is so dimensioned as to provide a so-called loose-fit therefor so that air may escape about its periphery. Thus the regenerators are, where desired, eliminated. Each of the regenerators 52 comprises a vertically oriented bore filled with spaced metallic members 54 such as steel wool, wires, or metallic turnings supported by tubular bodies, not designated, inserted into the bores. It will, therefore, be appreciated that as air entrapped in the expansion chamber 48 is expanded, in response to heat transferred thereto in response to an impingement of unconcentrated sunlight upon the external surfaces of the upper portion of the enclosure 12, a portion of the thus expanded air is forced downwardly through the regenerators 52 into the cooling chamber 50. Thus, the air confined within the working chamber is pressurized as pressure equalization within the pump is established. As the displacer is raised within the enclosure 12, during operation, substantially all of the remainder of the air confined in chamber 48 is forced through the regenerators 52 into chamber 50. As the air moves from the chamber 48, heat is given up to the metallic members 54. Conversely, air is forced in a reversed direction through the regenerators 52, as the displacer 44 is lowered within the enclosure 12 and the metallic members give up heat to the air as it moves from the chamber 50 back to the chamber 48. Consequently, the metallic members 54 of the regenerators 52 function as heat sinks through which solar heat is stored and then given up to air returning to the expansion chamber 48. Thus, the efficiency and water pumping capability of the pump are enhanced.

It is important to appreciate that reciprocal motion imparted to the displacer 44, as it is elevated and lowered within the housing 11, serves to establish the cyclic rate of operation for the pump 10, as will hereinafter become more readily apparent.

In order to elevate the displacer 44, within the enclosure 12, there is provided rigging, generally designated 56, through which the displacer 44 is connected with a tipple, generally designated 60. The rigging 56 includes suitable supporting structure 62 upon which is mounted in coplanar relation a pair of sheaves 64, one of which is disposed above the center of mass for the displacer 44. About these sheaves there is trained a line 66 which is passed through an opening 67 in the plate 16 and connected between the displacer 44 and the tipple 60. As a practical matter, a suitable connecting eye 68 is provided for the displacer 44, as well as for a tipple cup 70, of the tipple 60, and facilitates a coupling of the opposite ends of the line 66 thereto.

The tipple cup 70 is of a substantially inverted, truncated conical configuration, the apex portion of which is pivotally connected by a bearing pin 72 to a bracket, not designated, extended from the side wall 14 of the housing 11, beneath the discharge port 32. The tipple cup 70 is partially closed at the end thereof opposite the bearing pin 72 by a ported closure plate 73 including an intake port 73' through which water is introduced into the tipple cup and a discharge port 73" which serves as a metering orifice through which water is discharged from the cup. It is important to note that the cup 70 is so configured that the center of mass thereof, when filled with water, is in a vertical plane spaced outwardly from the bearing pin 72 so that the cup is forced to fall away from the side wall 14 in a pivotal fashion. Thus the cup 70 is caused to discharge its contents through the discharge port 73", as illustrated in FIG. 4. Of course, the size of the discharge port 73" dictates, at least in part, the rate at which the water is discharged from the tipple cup.

As illustrated in FIG. 3, the flume 42 includes a dribble aperture 74 located above the tipple cup 70 in order to accommodate a discharge of a determinable portion of the water flowing through the flume 42 to the cup 70 of the tipple 60. It, therefore, should be apparent that the size of the aperture 74 determines, at least in part, the rate at which the cup 70 is filled. As a practical matter, where desired, a transverse dam 76 is extended across the flume 42 downstream of the aperture 74, for stabilizing the rate of discharge for water flowing through the dribble aperture.

In view of the foregoing, it should be apparent that as the cup 70, of the tipple 60, pivots outwardly away from the housing 11, upon becoming filled with water, the displacer 44 is raised through a tensioning of the line 66. It is also important to understand that the mass of the displacer 44 is sufficient to permit the displacer 44 to gravitate downwardly against the mass of the cup, when emptied. Thus the emptied cup 70 is returned to its vertically oriented, water-receiving configuration under the influence of the weight of the displacer 44.

Additionally, it is to be understood that the enclosure remains hermetically sealed. Therefore, a bellows seal 78 is provided in sealing relation about the opening 67 formed in the top plate 16 and includes a sealed orifice, not designated, through which the line 66 is passed so that an air-tight integrity is maintained for the enclosure 12. Of course, other types of sealing devices can be employed, where so desired.

OPERATION

It is believed that in view of the foregoing description, the operation of the device will readily be understood and it will be briefly reviewed at this point.

With the pump 10 assembled in the manner hereinbefore described, it is prepared for operation by placing the lower portion thereof in a source of water, such as a stream, with the flume 42 being extended to a location above the water line of the source.

The tipple cup 70 of the tipple 60, initially, is vertically oriented with the intake port 73' disposed beneath the dribble aperture 74 preparatory to initiating operations of the pump 10. This arrangement of the tipple cup 70, of course, causes the displacer 44 to be suspended near the bottom of the enclosure 12 so that the volumetric dimensions of the expansion chamber 48 are maximized while the volumetric dimensions of the cooling chamber 50 are minimized.

As rays of sunlight impinge against the upper surfaces of the housing 11, atmospheric air entrapped within the expansion chamber 48 is heated and thus expanded for thus causing a part of the air to move downwardly through the regenerators 52 into the working chamber 50. As the thus expanded air is moved downwardly through the regenerators 52 heat is given up to the metallic members 54. However, due to the expansion of the air in the expansion chamber, the pressure of air confined within the cooling chamber 50 is increased as the air acts against the surface of water confined within the sump 20. Once the pressure of the air confined in the chamber 50 is adequately increased, the water in the sump is forced through the discharge conduit 34 and thence through the discharge port 32, as the ball 40 of the ball-check valve 37 rises off its seat.

Water discharged through the discharge port 34 is transported away from the pump 10 by the flume 42. However, as the water is coursed along the flume, over the dribble aperture 74, leakage occurs for thus filling the tipple cup 70 of the tipple 60. Of course, the rate at which the cup 70 is filled depends upon the rate of flow of the water delivered through the dribble aperture 74.

Once the tipple cup 70 is filled, the center of mass of the cup is moved outwardly from the bearing pin 72, so that the cup 70 is caused to pivot outwardly, away from the housing 11, against the applied mass of the displacer 44 suspended by the line 66. As the line 66 is thus further tensioned in response to pivotal motion imparted to the tipple cup 70, the displacer 44 is elevated within the enclosure 12. Thus the volumetric dimensions of the cooling chamber 50 are maximized while the volumetric dimensions of the expansion chamber are minimized. It will be appreciated that the air thus forced downwardly through the regenerator 52 is precooled by the metallic members 54 acting as heat sinks. Thus the temperature of the air within the cooling chamber 50 becomes substantially lower than that of the expansion chamber 48 and the pressure within the enclosure 12 is reduced due to the contraction of the air in the cooling chamber 50.

Due to the cooling of the air in the cooling chamber 50, the sump 20 experiences a reduction in pressure, whereupon the flapper valve 28 is caused to open in response to ambient pressures, for charging the sump 20. Charging continues until the pressure in the sump is equalized with ambient pressure, or until the tipple is emptied. The water in the tipple discharges through the discharge port 73" at a predetermined rate, allowing the displacer 44 to remain in the elevated position long enough for the air in the cooling chamber 50 to cool to the temperature of the water. Once the tipple cup 70 discharges its contents, the mass of the displacer 44 causes the displacer to return to its lowermost position, relative to the enclosure 12, for thereby reorienting the tipple cup 70 to its vertical water-receiving configuration, and reinitiating an expansion cycle of the air.

It should be appreciated that as the displacer 44 moves downwardly in the enclosure 12, air confined within the working chamber 50 is caused to flow in a reverse direction through the regenerator 52 whereupon an extraction of heat from the metallic members occurs so that less solar heat is required to bring the temperature of the air confined within the expansion chamber 48 back up to the required level. Thus, a cycle of operation is completed.

In view of the foregoing, it should readily be apparent that the pump which embodies the principles of the instant invention comprises a modified Stirling heat engine, the hot end of the cylinder of which is heated directly by the sun with the cool end being cooled by the water to be pumped, whereby there is provided a practical solution to the perplexing problem of providing automatic, fuel-free pumping facilitates for irrigation systems located in arid, underdeveloped regions of the earth.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A cyclically operable pump adapted to employ sunlight as a source of energy and atmospheric air as a working fluid for intermittently delivering a stream of water from a source, comprising:
   A. an hermetically sealed enclosure adapted to be seated in a source of water including a sump, means including a valved water intake port for intermittently delivering water from the source to said sump and a valved water discharge duct communicating with the sump for discharging water therefrom;
   B. pumping means for alternately forcing water through said intake port and through said discharge duct including,
      1. means defining in said enclosure an expansion chamber for partially confining air expanded by solar energy and means defining a cooling chamber communicating with said sump for confining in contact with water delivered to the sump air delivered from said expansion chamber including a displacer supported for rectilinear motion along a vertically oriented path extended between the expansion chamber and the cooling chamber for varying the volumetric dimensions of said chambers as motion is imparted to said displacer, and
      2. air delivery means for delivering air from said expansion chamber to said cooling chamber;
   C. a tipple cup supported adjacent to the discharge end of said discharge duct for pivotal displacement from a water-receiving position, wherein the cup is vertically oriented, to a water-discharge position, wherein the cup is horizontally oriented; and
   D. a line trained about a plurality of sheaves having one end thereof connected with said cup and the opposite end thereof connected with said displacer for raising said displacer as the cup is pivotally displaced to its water-discharge position, and for lowering said displacer, as said cup is pivotally displaced to its water-receiving position.

2. The pump of claim 1 further comprising a dribble aperture interposed between said discharge duct and said tipple cup for delivering water from the discharge port to said cup at a determinable rate as water is forced from said sump through said discharge duct.

3. The pump of claim 2 further comprising a closure plate for said cup and means defining in said closure plate a metering orifice for delivering water from the cup at a determinable rate when the cup is in its discharge position.

4. The pump of claim 2 wherein air is delivered from said expansion chamber to said cooling chamber and delivered from said cooling chamber to said expansion chamber, and said air delivery means includes:
   A. at least one bore extended through said displacer through which the air is delivered; and
   B. means defining in said bore a heat sink for extracting heat from the air as it is delivered to said cooling chamber and for delivering heat to the air as it is delivered to said expansion chamber.

5. The pump of claim 4 wherein said displacer comprises a block of expanded cellular polystyrene, and said heat sink comprises metallic components.

6. A solar-powered pump particularly suited for intermittently delivering a stream of water from a source comprising:
   A. a housing adapted to be seated in a source of water, including,
      1. means defining an hermetically sealed enclosure having a water discharge port for discharging a flow of water, adapted to be disposed above the water line of said source,
      2. a sump adapted to be disposed beneath the water line of said source,
      3. an inlet port including means adapted to establish intermittent communication between said sump and said source, and
      4. a duct communicating with said sump including means for intermittently conveying a stream of water from the sump to the discharge port; and
   B. means for alternatively charging said sump through said inlet port and for discharging said sump through said duct including,
      1. a displacer supported for reciprocation in said housing defining a variably dimensioned cooling chamber below said displacer and a variably dimensioned gas expansion chamber above said displacer,
      2. means defining a passageway between said chambers,
      3. means for imparting reciprocation to said displacer including a tipple cup, disposed in communication with said discharge port, supported for pivotal displacement from a water-receiving position, wherein the cup is positioned to fill water in response to a discharge of water from said discharge port, to a discharge position, wherein the cup is positioned to discharge water therefrom, and
      4. a flexible line trained about a plurality of sheaves having one end thereof connected to said cup and the opposite end thereof connected to said displacer.

7. A cyclically operable pump adapted to employ sunlight as a source of energy and atmospheric air as a working fluid for intermittently delivering a stream of water from a source, comprising:
   A. an hermetically sealed, upright, enclosure, including a sump arranged within the lowermost portion thereof, means including a valved water intake port for intermittently delivering water from a source to said sump, and means including a valved water discharge duct for intermittently delivering water from said sump;
   B. means for alternately forcing water through the intake port and through said discharge duct including a movable displacer supported for rectilinear motion along a vertical path defining within the uppermost portion of the enclosure an expansion chamber for partially confining a body of heated air, and further defining within the lowermost portion of the enclosure a cooling chamber for partially confining in contact with water delivered to the sump a body of cooled air; and
   C. air delivery means for alternately delivering air from said expansion chamber to said cooling chamber and from said cooling chamber to said expansion chamber as rectilinear motion is imparted to said displacer, including at least one bore extended through said displacer, and means defining in said bore a heat sink for extracting heat from the air as it is delivered from said expansion chamber to said cooling chamber, and for delivering heat to the air as it is delivered from said cooling chamber to said expansion chamber.

* * * * *